United States Patent [19]
Bürli et al.

[11] Patent Number: 4,559,176
[45] Date of Patent: Dec. 17, 1985

[54] PROCESS FOR THE PRODUCTION OF BENZANTHRONE

[75] Inventors: Martin Bürli, Magden; Jacques Bersier, Riehen; Eric Plattner, Seltisberg; Hans-Ulrich Herrmann, Basel, all of Switzerland

[73] Assignee: Ciba Geigy AG, Basel, Switzerland

[21] Appl. No.: 628,884

[22] Filed: Jul. 9, 1984

[30] Foreign Application Priority Data

Jul. 12, 1983 [CH] Switzerland ............. 3820/83

[51] Int. Cl.$^4$ ............................................. C07C 50/22
[52] U.S. Cl. .................................................. 260/352
[58] Field of Search ........................................ 260/352

[56] References Cited
U.S. PATENT DOCUMENTS 4,127,595 11/1978 Matsuura et al. .................... 260/352
4,296,043 10/1981 Schroeder ............................ 260/352
4,311,565 1/1982 Bersier et al. ....................... 260/352

FOREIGN PATENT DOCUMENTS 22062 5/1979 European Pat. Off. ............ 260/352
2751049 5/1978 Fed. Rep. of Germany ...... 260/352
2823160 11/1979 Fed. Rep. of Germany ...... 260/352
284035 1/1928 United Kingdom ................ 260/352

Primary Examiner—Glennon H. Hollrah
Assistant Examiner—Raymond Covington
Attorney, Agent, or Firm—Joseph G. Kolodny

[57] ABSTRACT

The invention describes a process for the production of benzanthrone by reacting anthraquinone with glycerol and/or acrolein, using anthrone as reducing agent.

Benzanthrone is an important intermediate for dyes and is used in particular for the preparation of vat dyes.

6 Claims, No Drawings

PROCESS FOR THE PRODUCTION OF BENZANTHRONE

The present invention relates to a process for the production of benzanthrone from anthraquinone, glycerol and anthrone.

Bezanthrone is an important intermediate for obtaining vat dyes. Up to now, the compound has been prepared by reacting anthraquinone and glycerol in the presence of heavy metals or salts thereof, so giving rise during working up to dilute solutions of metal salts which are difficult to dispose of.

Thus, for example, metals such as iron, zinc or copper in concentrated sulfuric acid are used to reduce anthraquinone to the semiquinone form. Such processes are described, inter alia, in U.S. Pat. No. 1,896,147 (with iron dust as reducing agent), U.S. Pat. No. 2,034,485 and USSR Pat. No. 401.130 (with iron and copper powder respectively as reducing agent), A. M. Lahin, Zhur. Obschei Khim. 18, 308 (1948), cf. CA 44, 1079b (with Zn, Al, $CuSO_4$ as reducing agent) and U.S. Pat. No. 1,791,309 (Zn or Al in combination with Cu as reducing agent). Among these reducing agents, iron has attained the greatest importance in practice. However, the use of iron as reducing agent entails substantial economic and environmental disadvantages, as at least 2 moles of iron per mole of anthraquinone have to be employed. The consequence is that, per mole of benzanthrone, 2.0 moles of iron sulfate (or, per 1000 g of benzanthrone, 1320 g of iron sulfate) occur as waste product.

An electrochemical process for the production of benzanthrone, which is described in EP-0010525 and EP-0022062, has been proposed as an alternative to the above described process. However, this electrochemical process requires special high-cost apparatus and, in addition, the procedure is fairly complicated.

Accordingly, it is the object of the present invention to provide a process for the production of benzanthrone which is simple to carry out and requires no special apparatus, and which at the same time proceeds as smoothly as the electrochemical process and therefore does not have the above mentioned shortcomings of the known processes.

This object is attained by reacting anthraquinone with glycerol and/or acrolein, under reductive conditions, to benzanthrone, using anthrone as reducing agent instead of metals or metal salts. Anthrone reduces the anthraquinone to oxanthrone and, in doing so, is itself converted to the semiquinone form (q.v. formulae below). It is therefore both reducing agent and, in oxidised form, at the same time starting material.

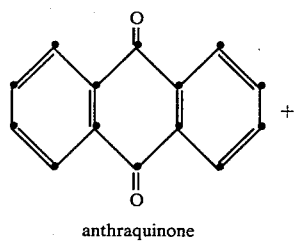
anthraquinone

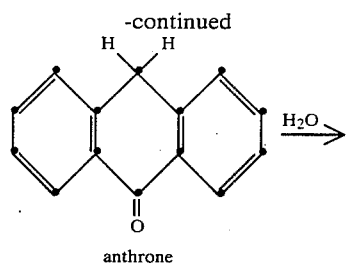
anthrone

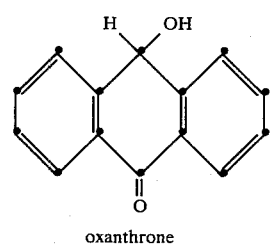
oxanthrone

The process of this invention accordingly comprises reacting anthraquinone with glycerol and/or acrolein in concentrated sulfuric acid, in the presence of anthrone, to benzanthrone in accordance with the following reaction scheme:

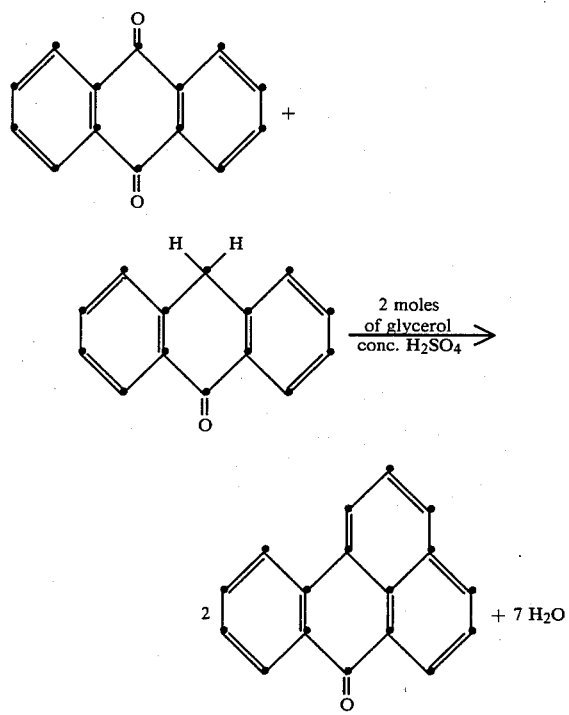

As the reducing agent itself reacts further to the final product, no metal salts which are difficult to dispose of occur and, in addition, the sulfuric acid can be readily brought to its initial concentration and recycled.

It is convenient to use an excess of anthrone (prepared e.g. by catalytic hydrogenation of anthraquinone according to EP-A 00 07 041). It is preferred to use 1.2 to 2.3 moles, in particular 1.4 to 1.8 moles, of anthrone per mole of anthraquinone. It will, of course, be understood that equimolar amounts of anthraquinone and anthrone can also be used. In that case, however, a certain residue of unreacted anthraquinone must be expected.

It is also advantageous to use an excess of glycerol, based on the total amount of anthraquinone and anthrone; but, compared with the above mentioned electrochemical process, substantially less glycerol is required. It is preferred to use 1.1 to 1.5 moles, in particular 1.3 moles, of glycerol per mole of anthraquinone/anthrone mixture.

The glycerol is preferably added to the anthraquinone simultaneously with the anthrone. As the reaction is carried out in concentrated sulfuric acid, advantageously in sulfuric acid having a concentration of 80 to 95%, the glycerol dehydrates to acrolein, so that a portion of the glycerol, or even the entire amount of glycerol, can be replaced by acrolein.

The benzanthrone synthesis is conveniently carried out by the process of this invention in the temperature range from 100° to 200° C., preferably from 120° to 160° C. Temperatures below 100° C. are to be avoided, as this may result in an accumulation of starting material which then reacts unchecked with a certain delay, accompanied by vigorous evolution of gas and foam.

In addition to unsubstituted anthraquinone, suitable starting materials are also those anthraquinones which contain one or more substituents. Examples of possible substituents are: lower alkyl such as the methyl or ethyl group, and lower alkoxy such as the methoxy, ethoxy, n- or isopropoxy group or the butoxy group; halogen such as fluorine, chlorine or bromine; the phenyl radical or the hydroxyl group. If it is desired to obtain as homogeneous a product as possible, then correspondingly substituted anthrones should also be used when using anthraquinone derivatives.

The process of the invention is carried out e.g. as follows: Anthraquinone is suspended in about 85% sulfuric acid and the suspension is heated to a temperature in the range from about 120° to 160° C. To the hot suspension are then slowly added simultaneously glycerol and preferably fused anthrone over several hours. As the fused anthrone is susceptible to oxidation, it is advantageous to carry out the reaction in an inert gas atmosphere (e.g. nitrogen or argon).

When the reaction has subsided, the reaction mixture is cooled to 120° C. and then poured into one or two times its volume of water while keeping the temperature of the water in the range from 50° to 80° C. by cooling. The precipitated benzanthrone is isolated by filtration and washed with hot water until neutral. The crude benzanthrone can then be purified by boiling it in sodium hydroxide solution. A very pure product (>97% purity) is obtained in a yield of about 90%, based on the total amount of anthraquinone and anthrone. A further purification of the product by distillation or sublimation—often necessary in the known processes of the prior art—is not necessary in the process of this invention. The dilute sulfuric acid which remains after separation of the benzanthrone can be restored to its initial concentration e.g. by means of a thin-layer evaporator and re-used for the next batch.

The invention is illustrated by the following Examples in which parts and percentages are by weight.

EXAMPLE 1

A reaction vessel, equipped with stirrer and drip funnel, is charged with 2100 parts of 85% sulfuric acid. Drip funnel and reaction vessel can be heated and are first sparged with nitrogen. Then 131.6 parts of anthraquinone are stirred into the sulfuric acid and the contents of the reaction vessel are heated to 130°–140° C. Simultaneously the drip funnel is filled with 194 parts of anthrone, which is then fused under an atmosphere of nitrogen. The temperature of the heat exchanger in the heating jacket of the drip funnel is adjusted to 215°–220° C. Once the temperature in the reaction vessel has risen to 130° C., the flow of nitrogen is discontinued and the addition of anthrone and glycerol is begun. First 9.8 parts of glycerol are rapidly added and then 185.6 parts of glycerol and the liquid anthrone are slowly added from the drip funnel to the hot anthraquonone suspension over 1½ hours. The batch is allowed to react for another hour and then the temperature of the reaction mixture is lowered from 135°–140° C. (reaction temperature) to 120° C. For working up, the reaction mixture is poured into 1143 parts of water, the temperature of which is kept at 50°–70° C. by cooling. The precipitated benzanthrone is isolated by filtration and the filter cake is washed until neutral and dried. The crude benzanthrone (about 90% purity) is boiled for 2 hours in dilute sodium hydroxide solution in an autoclave at 140°–145° C., then isolated by filtration at 70° C. The filter cake is washed with water until neutral and dried, affording 347 parts of benzanthrone in 97–98% purity. The yield is 92%, based on the total amount of anthraquinone and anthrone. Melting point: 174° C.

EXAMPLE 2

A reaction vessel, equipped with stirrer and drip funnel, is charged with 126 parts of anthraquinone. Drip funnel and reaction vessel can be heated and are initially sparged with nitrogen. To the anthraquinone are added 898 parts of 98% sulfuric acid and then 102 parts of water. Then 194 parts of anthrone are weighed into the drip funnel and fused. The contents of the reaction vessel are heated to 130° C. and then the simultaneous addition of anthrone and glycerol is begun. First 9.5 parts of glycerol are added rapidly and then 180.2 parts of glycerol and the anthrone melt are slowly added to the hot anthraquinone/sulfuric acid suspension over 1½ hours. The batch is allowed to react for another hour and then the temperature of the reaction solution is lowered from 135°–140° C. (reaction temperature) to 120° C. For working up, the reaction mixture is poured into 500 parts of water, the temperature of which is kept at 50°–70° C. by cooling. The precipitated benzanthrone is isolated by filtration and the filter cake is washed until neutral. The crude benzanthrone of about 90% purity (dry content) is purified by boiling it for 2 hours in dilute sodium hydroxide solution in an autoclave at 140°–145° C. and then isolated by filtration at 70° C. The filter cake is washed with water until neutral and dried, affording 333 parts of benzanthrone of 97–98% purity. The yield is 89%, based on the total amount of anthraquinone and anthrone. Melting point: 174° C.

EXAMPLE 3

A reaction vessel, equipped with stirrer and drip funnel, is charged with 129.3 parts of anthraquinone. Drip funnel and reaction vessel can be heated and are initially sparged with nitrogen. To the anthraquinone are added 898 parts of 98% sulfuric acid and then 102 parts of water. Then 186.9 parts of anthrone are weighed into the drip funnel and fused. The contents of the reaction vessel are heated to 130° C. and then the simultaneous addition of anthrone and glycerol is begun. First 10 parts of glycerol are added rapidly and then 166 parts of glycerol and the anthrone melt are slowly added to the hot anthraquinone/sulfuric acid suspension over 3 hours. The batch is allowed to react for another hour and then the temperature of the reaction solution is lowered from 135°–140° C. to 120° C. For working up, the reaction mixture is poured into 500 parts of water, the temperature of which is kept at 50°–80° C. by cooling. The precipitated benzanthrone is isolated by filtration at 70° C. and the filter cake is washed until neutral.

It is, however, also possible to pour the reaction mixture first into half the amount of water at 50°–80° C. and then to add the rest of the water, so giving a more readily filterable reaction mixture.

The crude benzanthrone of about 50% purity (dry content) is purified by boiling it for 2 hours in dilute sodium hydroxide solution in an autoclave at 140°–145° C., and then isolated by filtration at 70° C. The filter cake is washed with water until neutral and dried, affording 333 parts of benzanthrone of 97–98% purity. The yield is 92%, based on the total amount of anthraquinone and anthrone. Melting point: 174° C.

EXAMPLE 4

A glass reactor, equipped with stirrer, is charged with 477 parts of 88% sulfuric acid. Then 52.1 parts of methyl anthrone (β-methylanthrone as main component) are added. The temperature is kept at 20°14 25° C. and the mixture is stirred until a solution is obtained. Then 16.8 parts of water are added dropwise and 49.9 parts of glycerol are added dropwise to this solution. A reaction vessel, equipped with stirrer, is charged with 34.7 parts of anthraquinone and 100 parts of 85% sulfuric acid are added. The contents of the reactor are heated to 135°–140° C. and then the mixture of methyl anthrone/glycerol/sulfuric acid is added over one hour, while keeping the temperature at 135°–140° C. The reaction mixture is then stirred for 30 minutes at 135° C.

For working up, the reaction mixture is cooled to 120° C. and poured in the course of 30 minutes into 276.5 parts of water which is kept at 50°–80° C. Then a further 276.5 parts of water are added at 80° C. The reaction mixture is cooled and the product is isolated by filtration and washed with water until neutral. The moist crude product (47.5% dry content) is stirred into 888 parts of chloroform. After filtration, the filtrate is extracted three times with 500 parts of 3% NaOH. The organic phase is then washed with water until neutral, dried over calcium chloride and the solvent is evaporated off. The residue is dried, giving a product mixture of benzanthrone and methyl benzanthrone in about 70% purity. The product begins to sinter at 115° C. and to melt at 150° C.

What is claimed is:

1. A process for the production of benzanthrone by reacting anthraquinone with glycerol and/or acrolein in the presence of a reducing agent, in concentrated sulfuric acid as reaction medium, wherein anthrone is used as reducing agent.

2. A process according to claim 1, wherein an excess of anthrone is used, based on anthraquinone.

3. A process according to claim 2, wherein the molar ratio of anthrone to anthraquinone is 1.2 to 2.3.

4. A process according to claim 1, wherein 1.1 to 1.5 moles of glycerol are used per mole of anthraquinone/anthrone mixture.

5. A process according to claim 1, wherein the reaction is carried out in the temperature range from 100° to 200° C., preferably from 120° to 160° C.

6. A process according to claim 1, wherein glycerol and anthrone are simultaneously added to anthraquinone in sulfuric acid.

* * * * *

UNITED STATES PATENT AND TRADEMARK OFFICE
CERTIFICATE OF CORRECTION

PATENT NO.  : 4,559,176
DATED       : December 17, 1985
INVENTOR(S) : Martin Burli, et al.

It is certified that error appears in the above-identified patent and that said Letters Patent is hereby corrected as shown below:

Col. 2, line 16   Before structure insert --2--

Col. 5, line 29   Delete "20° 14 25°" and substitute --20° - 25°--

Signed and Sealed this

First Day of April 1986

[SEAL]

Attest:

DONALD J. QUIGG

Attesting Officer

Commissioner of Patents and Trademarks